United States Patent [19]

Kazlauskas

[11] Patent Number: 4,857,690
[45] Date of Patent: Aug. 15, 1989

[54] CASSETTE WELDING HEAD APPARATUS

[76] Inventor: Gasparas Kazlauskas, 1134 Tower Rd., Beverly Hills, Calif. 90210

[21] Appl. No.: 234,489

[22] Filed: Aug. 22, 1988

[51] Int. Cl.⁴ .............................................. B23K 9/00
[52] U.S. Cl. ............................... 219/60 A; 219/125.11
[58] Field of Search ........................ 219/60 A, 125.11

[56] References Cited

U.S. PATENT DOCUMENTS

| | | | |
|---|---|---|---|
| 3,238,347 | 3/1966 | Rohrberg et al. | 219/60 A |
| 3,395,262 | 7/1968 | Kazlauskas | 219/60 A |
| 3,823,298 | 7/1974 | Rohrberg et al. | 219/60 A |
| 4,379,215 | 4/1983 | Rohrberg | 219/60 A |

Primary Examiner—Clifford C. Shaw
Attorney, Agent, or Firm—Jack C. Munro

[57] ABSTRACT

An apparatus for welding together coaxial tube sections which utilizes a welding electrode housing and a mounting housing. The welding electrode housing is to be clamped onto the tube sections and hold them in an abutting, coaxially aligned position. The welding electrode housing is then to be fixedly mounted onto the mounting housing with the welding procedure then being initiated. The mounting housing includes a structure required to produce the welding operation. The mounting housing is connectable to different welding electrode housings, each of which is to connect with a different size of tube to be welded.

2 Claims, 3 Drawing Sheets

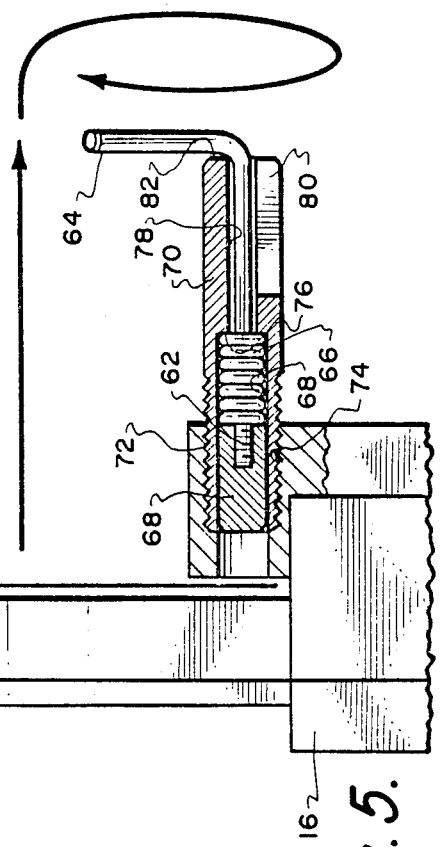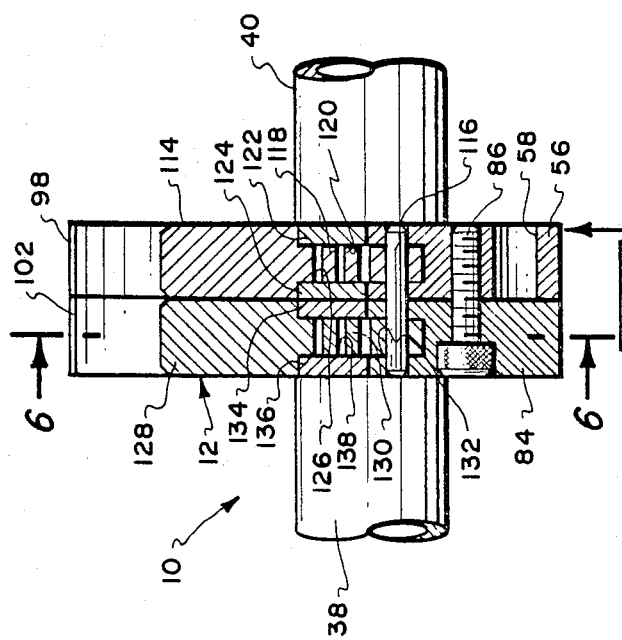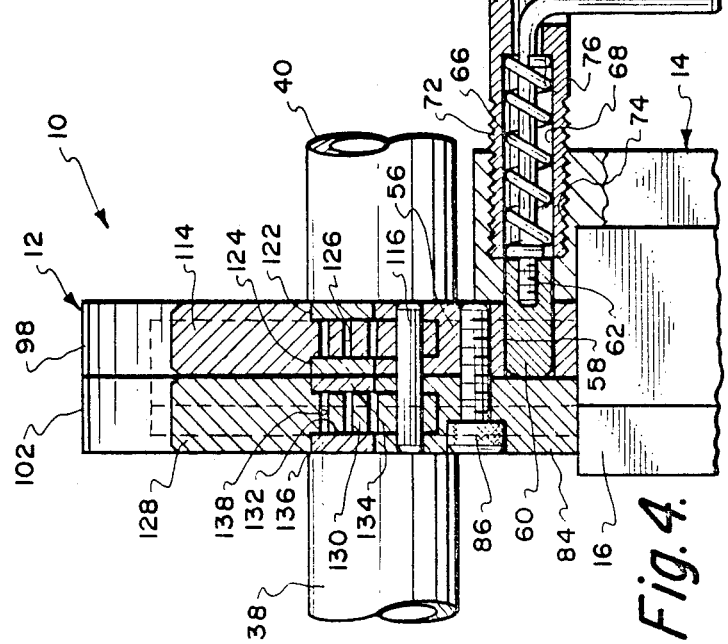

CASSETTE WELDING HEAD APPARATUS

BACKGROUND OF THE INVENTION

The field of this invention relates to the welding of separate, coaxially located, edge abutting, metallic, cylindrical, tubular sections. More particularly, the field of this invention is directed to an apparatus for automatic gas tungsten arc welding along a circumferential path thereby securing separate tubes (or pipes) together forming essentially an integral, totally enclosed, tube.

The use of apparatuses to affect automatic welding of tubes has long been known. A common such apparatus is what is shown and described within U. S. Pat. No. 3,400,237, by the present invention. The apparatus of the present invention is to employ a weld technique similar to the aforesaid patent, and reference may be had to the aforesaid Patent for background information of the welding technique.

One of the inherent disadvantages of the aforesaid Patent is that the entire welding head is designed to be utilized in conjunction with a limited size range of tubes. In other words, a particular welding head would be designed for one-half inch tubes, while another welding head would be designed for three-quarter inch tubes. Each welding head is basically similar with the difference in the welding heads having to do with the structure that is attached to accommodate the particular size of tubes.

It would be highly advantages for efficient creating of welds and from a cost standpoint if a welding head apparatus could be constructed which divided the welding head into two separate parts. One part could contain the structure that is common to the welding procedure, regardless of the size of the tube being welded, and the other structure could pertain to the particular size of the tube being welded. The structures could then be attached together on a quick disconnect basis with the result that the overall welding head apparatus could be utilized on a wide variety of different size tubes rather than being restricted to a particular size of tubes.

SUMMARY OF THE INVENTION

The primary objective of the present invention is to construct a welding head apparatus which could be utilized to weld a wide variety of different sizes of tubes.

The structure of the present invention is directed to a tubular welding apparatus which utilizes a welding electrode housing which is to be clampable onto a pair of coaxially aligned tubes that are located in an edge abutting relationship and are to be welded. Within this welding electrode housing is located a welding electrode which is positioned to be rotatably driven around the welding area located between the clamped tubes. This welding electrode housing includes a plurality of clamping plates located in an aligned pair relationship. Between each aligned pair of clamping plates is located an opening within which is to be located a tube to be welded. This opening is constructed to be of a particular size to correspond to the size of the tube that is being welded. Within each of the clamping plates surrounding this opening is a slot arrangement which provides a resilient clamping force which provides for a greater degree of size tolerance concerning the tubes to be welded. In clamping of the clamping plates together, about the tube, there is utilized a pair of toggle levers. Each toggle lever includes a series of slots to again provide an increased level of tolerance in conjunction with the establishing of the clamping force onto the tube. Associated with the welding electrode housing are a pair of manually operating latching pin assemblies. These latching pin assemblies are for the purpose of facilitating quick engagement and disengagement from the mounting housing.

BRIEF DESCRIPTION OF THE DRAWINGS

FIG. 4 is a cross-sectional view through a portion of the welding head apparatus of the present invention taken along line 4—4 of FIG. 2 showning a latching pin assembly which connects the mounting housing and the welding electrode housing in the latched position;

FIG. 5 is a view similar to FIG. 4 but showing the latching pin assembly in the unlatched position and showing the welding electrode housing in a displaced position from the mounting housing;

DETAILED DESCRIPTION OF THE SHOWN EMBODIMENT

Figure 1:
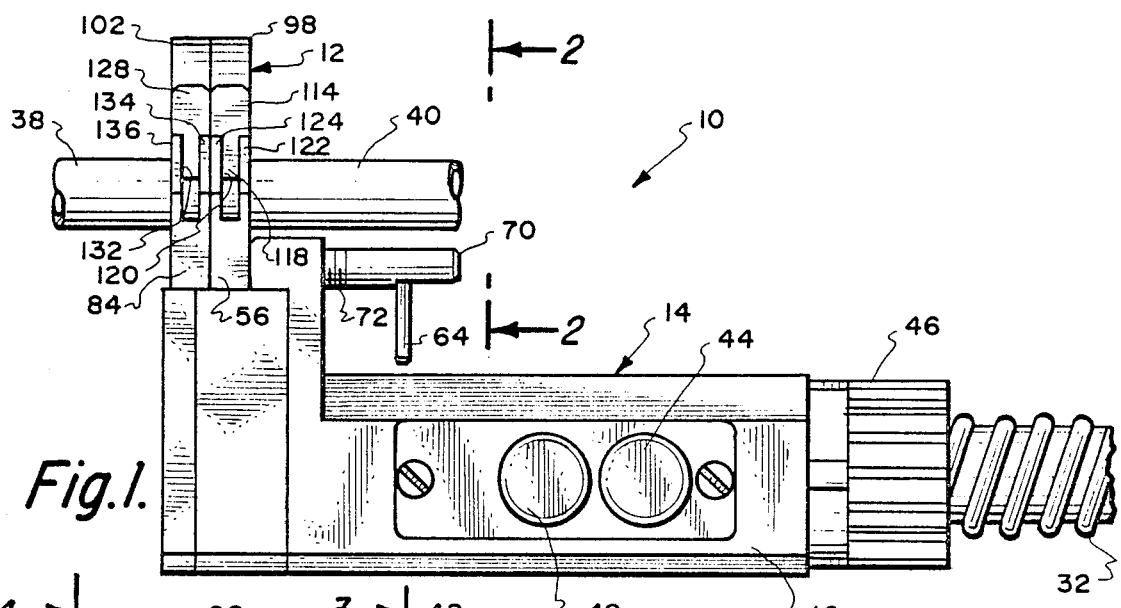
FIG. 1 is a side elevational view of the cassette welding head apparatus of the present invention showing the welding head apparatus connected to a pair of coaxially aligned tubes that are to be welded.
Figure 2:
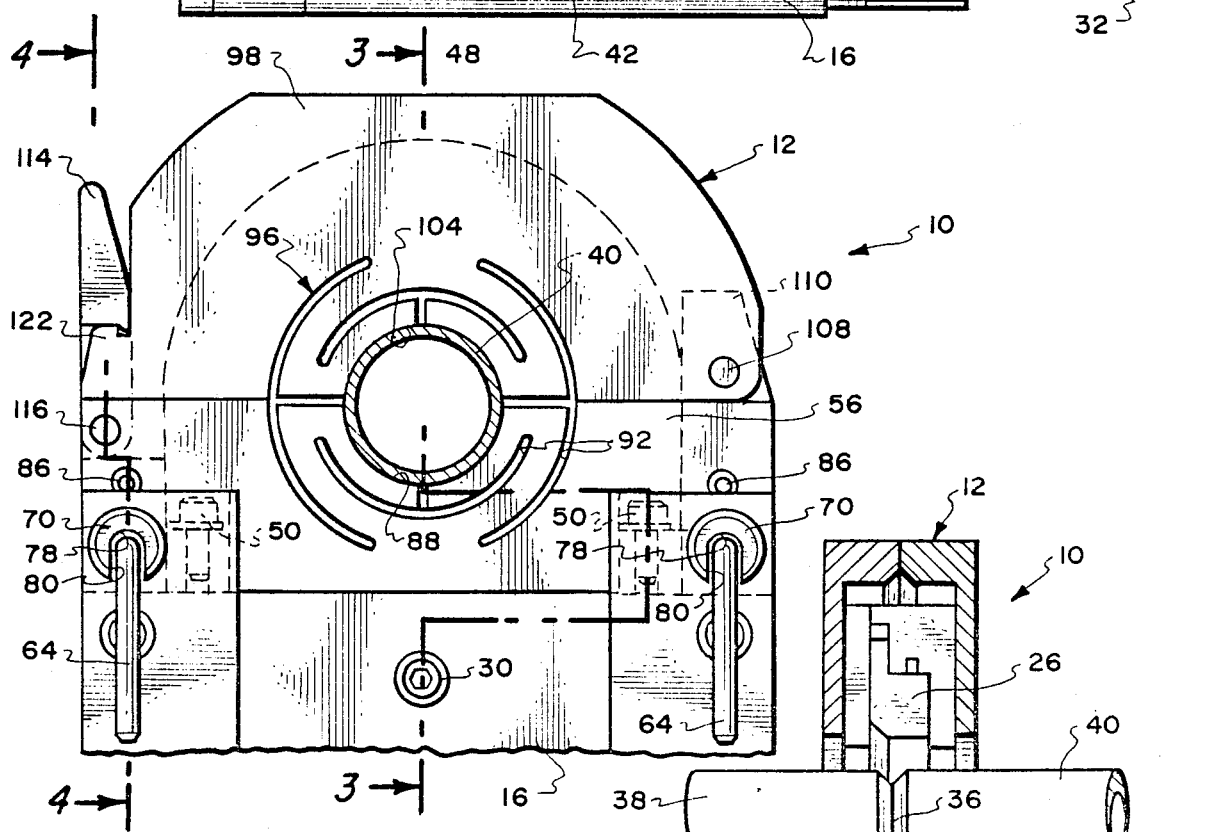
FIG. 2 is a right side view of a portion of the cassette welding head apparatus taken along line 2—2 of FIG. 1.
Figure 3:
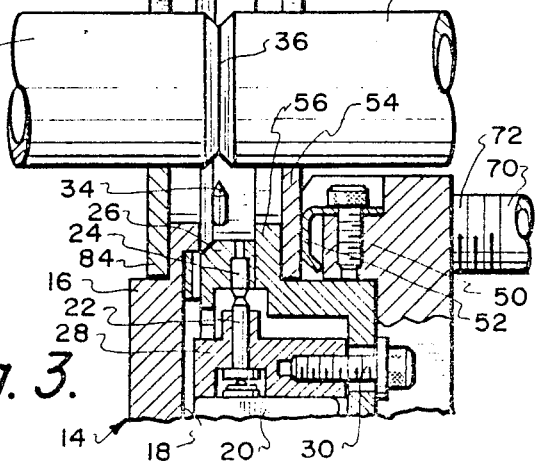
FIG. 3 is a cross-sectional view through the welding head apparatus of the present invention taken along line 3—3 of FIG. 2 showing clearly the connection of the welding head apparatus to the tubes that are to be welded.

Referring particularly to the drawings, there is shown the cassette welding head apparatus 10 of this invention which is composed generally of a welding electrode housing 12 and a mounting housing 14. The mounting housing 14 is formed of a sheet material outer cover 16 which defines an internal chamber 18. Within this internal chamber 18 is mounted the necessary structure required to produce a welding operation. A portion of this structure is shown in FIG. 3 such as pressure operated switch 20 which is to be used to deactivate a motor (not shown) which is also mounted within the internal chamber 18. The switch 20 is operated when actuating pin 22 is moved when contacted by protruding pin 24. Protruding pin 24 is mounted within a ring gear 26 which is rotatably mounted within the welding electrode housing 12. This ring gear 26 is engaged with a planetary gear system (not shown) which is operated by the motor (not shown) previously mentioned. The actuating pin 22 is mounted within block 28 which is fixedly mounted by fastener 30 to the cover 16.

Electrical power is to be supplied to the motor (not shown) through a conduit 32. Also, inert gas will be supplied through the conduit 32 and is to be conducted by appropriate passages (not shown) to flood the welding area around the welding electrode 34. This welding electrode 34 is fixedly mounted within the ring gear 26. Normally, the welding electrode 34 can be adjusted toward and away from the weld area 36 defined between the coaxially aligned, edge abutting, tubes 38 and 40. It is these tubes 38 and 40 that are to be welded together. Electrical energy is to be supplied by appropriate electrical connectors to the ring gear 26 and hence to the welding electrode 34.

Manual operation of the motor (not shown) is permitted by pushing of start button 42 or deactivation by pushing of stop button 44. Conduit 32 is mounted in conjunction with the cover 16 by means of connector 46. Start button 42 and stop button 44 are mounted on a plate 48 which in turn is fixedly mounted on cover 16. Mounted on the cover 16 by means of a fastener 50 is a spring plate 52. This spring plate 52 is to be adjusted to snugly hold fixed clamping plate 54 against wall 56. Wall 56 is part of the cover 16. Fixed clamping plate 54 is part of the welding electrode housing 12. It is to be understood that the fixed clamping plate 54 is to be manually disengageable from its position between wall 56 and the spring plate 52. It is to be understood that there are two in number, spaced apart, fasteners 50 and spring plates 52.

The fixed clamping plate 56 includes a pair of spaced apart holes 58. Each hole 58 is to accommodate in a mating manner a rod 60. This rod 60 is threadably secured to the inner end 62 of an L-shaped handle member 64. It is to be noted that there are two in number of the handle members 64 with each handle member 64 being connected to a separate rod 60 which is to be engageable with only one of the holes 58. Mounted about each handle member 64 is a coil spring 66 with therebeing a separate coil spring 66 for each handle member 64. The coil spring 66 rests within a spring chamber 68 formed within tubular member 70. The inner end of tubular member 70 is formed into series of exterior threads 72 with these threads 72 to threadably engage with internal threads 74 formed within an opening provided within cover 16. The outer end of the spring 66 rests against a shoulder 76 formed within tubular member 70.

The outer end of the handle member 64 is located within hole 78 formed within the outer end of the tubular member 70. Hole 78 is open to the ambient. The outermost portion of the outer end of the handle member 64 is located substantially at a right angle to the hole 78 and is located within slot 80.

Figure 7:
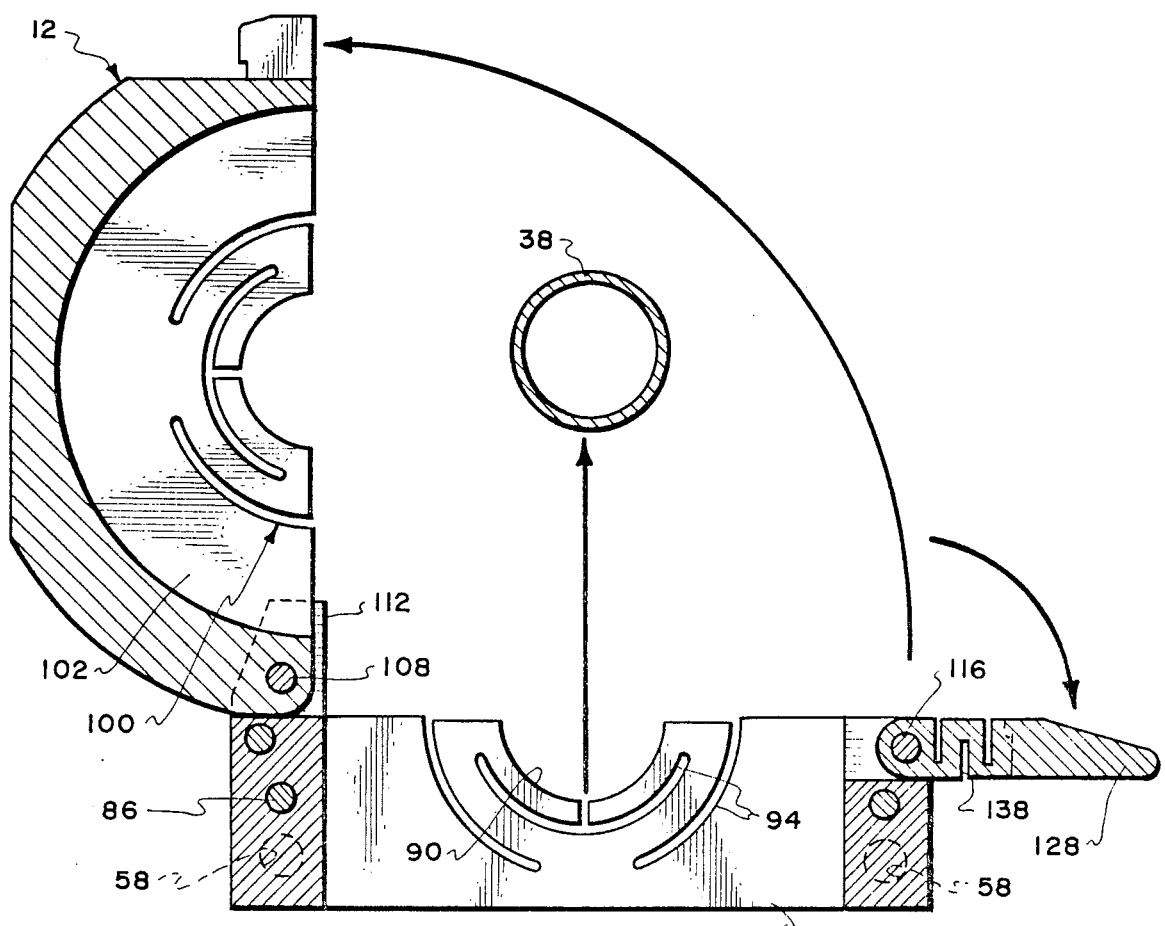
FIG. 7 is a view similar to FIG. 6 but showing the tube clamping arrangement in a non-clamping position.

When rod 60 is located within the hole 58, as is shown within FIG. 4 of the drawings, the outer end of the handle member 64 is located at the inner end of the slot 80. This outer end of the handle member 64 is to be manually grasped and moved in an outward direction compressing spring 66 causing the rod 60 to disengage from its respective hole 58. When the outer end of the handle member 64 is free of the slot 80, the handle member 64 can be pivoted and rest against the outer end 82 of the tubular member 70. This position is clearluy shown in FIG. 5 of the drawings. At this particular time, the welding electrode housing 12, as well as the tubes 38 and 40, can be disengaged from the mounting housing 14 as is also clearly shown in FIG. 7 of the drawings.

Fixedly mounted to the fixed plate 56 is a similar fixed plate 84. Plates 56 and 84 are located in juxtaposition. Plates 56 and 84 are fixedly secured together with the use of a pair of bolt fasteners 86. Fixed plated 56 includes a centrally disposed, half circular recess 88. Within this recess 88 is located the tube 40. In a similar manner, the fixed plate 84 includes a half circular recess 90. Within this recess 90 is located the tube 38. Formed within the plate 56 directly adjacent the tube 40 is a slot arrangement 92. A similar slot arrangement 94 is formed within the fixed plate 84. The function of the slot arrangements 92 and 94 is to permit a slight enlargement of the recesses 88 and 90 to accommodate to slightly over-sized tubes 38 and 40.

A similar slot arrangement 96 is formed within the movable plate 98. Also, a similar slot arrangement 100 is formed within the movable plate 102. The slot arrangement 96 is to connect with tube 40 while slot arrangement 100 connects with tube 38. The slot arrangement 96 is located directly adjacent a half circular recess 104 formed within the movable plate 98. The slot arrangement 100 is located directly adjacent half circular recess 106 formed within the movable plate 102. The recesses 88 and 104 connect together to completely enclose and clamp onto the tube 40. In a similar manner, the recesses 90 and 106 completely enclose and clamp onto tube 38. Again, the slot arrangements 96 and 100 permit their respective recesses 104 and 106 to expand slightly to accommodate to slightly increased size of their respective tubes 38 and 40. The weld area 36 is equidistantly spaced between recesses 104 and 106 and of course recesses 88 and 90.

The movable plate 98 is connected by a pivot pin 108 to extension 110. Extension 110 is integral with fixed plate 56. In a similar manner, the movable plate 102 is pivotably connected by means of the same pivot pin 108 to extension 112 which is integral with fixed plate 84. It is to be understood that movable plates 98 and 102 are independently movable relative to their respective fixed plates 56 and 84. Movable plates 98 and 102 can be pivoted about the pivot pin 108 from the closed position shown in FIG. 6 to the open position shown in FIG. 7.

Figure 6:
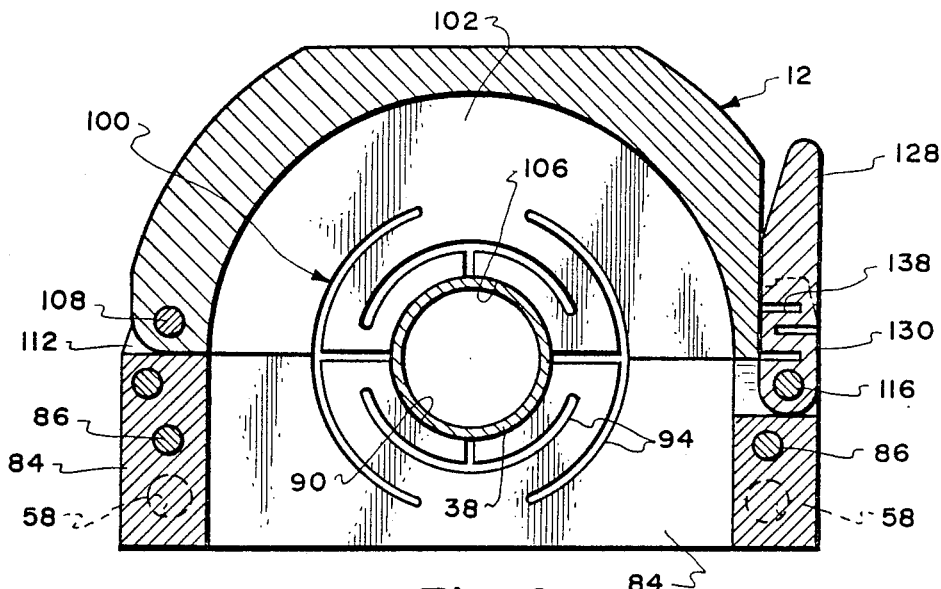
FIG. 6 is a cross-sectional view taken along line 6—6 of FIG. 5 showing the tube clamping arrangement in the clamped position.

When in the closed position in FIG. 6, the movable plate 98 can be latched closed by means of a latching lever 114 which is pivotally mounted by means of a pivot pin 116 to the fixed plate 56. This latching lever 114 has a necked-down section 118 which fits between the thin bifurcated cam members 122 and 124. Cam members 122 and 124 are identical and include an outer rounded cam surface. The enlarged head section of the lever 114 can be moved against these outer rounded cam surfaces of the members 122 and 124 pressing together plates 98 and 56. Included within the lever 114 are a series of slots 126 which provide a small amount of resilience for extendability in length of the lever 114. The reason for this is that, if the tube 40 is slightly over-sized and it is difficult to clamp tightly the movable plate 98 directly against the plate 56, this oversizing will be compensated for by a slight extension of the lever 114 with this extending of the lever 114 being permitted by the forming of the slots 126 therewithin. These slots 126 are actually formed within the necked-down section 118.

In a similar manner, there is a locking lever 128 which is also pivotally mounted on the pivot pin 116. This locking lever 128 also includes a necked-down section 130 which is matingly located within a slot 132 formed between bifurcated cam members 134 and 136. Within the necked-down area 130 is located a similar series of slots 138.

The primary feature of the present invention is that each welding electrode housing 12 is designed to be mounted on a particular tube such as a one inch diameter tube. Another welding electrode housing 12 could be of a size configration to be mounted on a different size tube such was one and one-half inches in diameter. Each welding electrode housing 12 can be individually connected to the mounting housing 14 through the use of actuator pin assemblies composed of members 60 through 82. The welding procedure could be completed for each size of the tubes 38 and 40 using the same mounting housing 16.

What is claimed is:

1. A cassette welding head apparatus comprising:
a welding electrode housing, a welding electrode mounted within said welding electrode housing, said welding electrode housing having tube clamping means, said tube clamping means being adapted to clamp onto a pair of tubes to be welded together;
a mounting housing, said mounting housing including structure for operating said welding electrode in the welding of the pair of tubes, the improvement comprising:
said welding electrode housing being separable from said mounting housing, said welding electrode housing being attachable by latching means to said mounting housing, said latching means including quick disconnect means, said quick disconnect means being operable to positively secure together said welding electrode housing and said mounting housing and also operable to permit disengagement of said welding electrode housing and said mounting housing; and
said tube clamping means having a pair of fixed plates and a pair of movable plates, a said movable plate to be in alignment with a said fixed plate, the aligned pair of a said fixed plate and a said movable plate being located in a parallel spaced apart relationship relative to the other said movable plate and said fixed plate, each said aligned pair of said fixed plate and said movable plate defining a center opening, a tube to connect with each said center opening, toggle means for securing each said movable plate relative to its respective said fixed plate with therebeing a separate said toggle means for each said movable plate, each said toggle means including a clamping lever, each said clamping lever including slot means, said slot means permitting slight longitudinal expansion of said clamping lever during installation of the said clamping lever into a clamping position.

2. The cassette welding head apparatus as defined in claim 1 wherein:
said latching means comprising a pair of manually operable latching pin assemblies, each said latching pin assembly being movable between a latched position and an unlatched position, with said latching pin assemblies in said unlatched position said welding electrode housing capable of being separated from said mounting housing, with said latching pin assemblies in said latched position said welding electrode housing being fixedly secured to said mounting housing.

* * * * *